United States Patent
Khosrowpour et al.

(10) Patent No.: US 11,327,869 B2
(45) Date of Patent: May 10, 2022

(54) DISTRIBUTED ARCHITECTURE FOR DETERMINING PERFORMANCE PARAMETERS

(71) Applicant: Dell Products L.P., Round Rock, TX (US)

(72) Inventors: Farzad Khosrowpour, Pflugerville, TX (US); Mitchell Anthony Markow, Hutto, TX (US)

(73) Assignee: Dell Products L.P., Round Rock, TX (US)

( * ) Notice: Subject to any disclaimer, the term of this patent is extended or adjusted under 35 U.S.C. 154(b) by 255 days.

(21) Appl. No.: 15/645,758

(22) Filed: Jul. 10, 2017

(65) Prior Publication Data

US 2019/0012251 A1 Jan. 10, 2019

(51) Int. Cl.
| | |
|---|---|
| G06F 11/34 | (2006.01) |
| G06F 11/30 | (2006.01) |
| H04L 43/04 | (2022.01) |
| H04L 12/14 | (2006.01) |
| H04M 15/00 | (2006.01) |

(52) U.S. Cl.
CPC ...... *G06F 11/3409* (2013.01); *G06F 11/3006* (2013.01); *H04L 12/1403* (2013.01); *H04L 12/1425* (2013.01); *H04L 43/04* (2013.01); *H04M 15/31* (2013.01)

(58) Field of Classification Search
None
See application file for complete search history.

(56) References Cited

U.S. PATENT DOCUMENTS

| | | | | |
|---|---|---|---|---|
| 9,800,466 | B1* | 10/2017 | Rangole | H04L 41/0823 |
| 10,257,275 | B1* | 4/2019 | Dirac | G06N 7/005 |
| 10,355,946 | B1* | 7/2019 | Dolas | H04L 43/0817 |
| 2007/0112976 | A1* | 5/2007 | Anders | H04L 12/4625 |
| | | | | 709/246 |

(Continued)

OTHER PUBLICATIONS

Li et al. "Scaling Distributed Machine Learning with the Parameter Server", OSDI' 14 Proceedings of the 11th USENIX Conf., Oct. 6, 2014 [retrieved on Dec. 23, 2019]. Retrieved from the Internet: <URL: https://www.cs.cmu.edu/~muli/file/parameter_server_osdi14.pdf>. (Year: 2014).*

(Continued)

*Primary Examiner* — Kevin T Bates
*Assistant Examiner* — Dae Kim
(74) *Attorney, Agent, or Firm* — Norton Rose Fulbright US LLP (57) ABSTRACT

System performance of a first information handling system may be adjusted based on system usage. Performance parameters may be determined by a second information handling system based on the system usage and may be used, by the first information handling system, to adjust system performance. Configuration of the first information handling system may thus be distributed to two or more tiers. The second information handling system can be more efficient with determining operating parameters for the first information handling system when the second system is not power limited, as when the first information handling system is a mobile device.

20 Claims, 5 Drawing Sheets

(56) References Cited

U.S. PATENT DOCUMENTS

| | | | | |
|---|---|---|---|---|
| 2011/0041136 | A1* | 2/2011 | Messier | G06F 9/5066 718/105 |
| 2011/0078291 | A1* | 3/2011 | Bickson | G06F 11/3452 709/221 |
| 2011/0191781 | A1* | 8/2011 | Karanam | G06F 9/50 718/104 |
| 2012/0158816 | A1* | 6/2012 | Choi | G06F 9/4881 709/201 |
| 2012/0185821 | A1* | 7/2012 | Yaseen | G06F 8/10 717/105 |
| 2013/0232331 | A1* | 9/2013 | Farhan | G06F 9/4401 713/100 |
| 2015/0370603 | A1* | 12/2015 | Fuller | G06F 9/5066 718/104 |
| 2017/0060635 | A1* | 3/2017 | Wu | G06F 9/5011 |
| 2018/0006886 | A1* | 1/2018 | Dhanakshirur | G06F 11/3433 |
| 2018/0341851 | A1* | 11/2018 | Chung | G06N 3/082 |

OTHER PUBLICATIONS

Jiang et al. "Heterogeneity-aware Distributed Parameter Servers", SIGMOD '17, pp. 463-478, May 14, 2017 [retrieved on Jun. 21, 2020]. Retrieved from the Internet: <URL: https://dl.acm.org/doi/pdf/10.1145/3035918.3035933>. (Year: 2017).*

Li et al. "Communication Efficient Distributed Machine Learning with the Parameter Server", NIPS 2014, 2014 [retrieved on Jun. 21, 2020]. Retrieved from the Internet: <URL: https://papers.nips.cc/paper/5597-communication-efficient-distributed-machine-learning-with-the-parameter-server.pdf>. (Year: 2014).*

Li, Mu. "Scaling Distributed Machine Learning with System and Algorithm Co-design", Dissertation at Carnegie Mellon University, Feb. 2017 [retrieved on Dec. 22, 2020]. Retrieved from the Internet: <URL: http://128.2.220.86/anon/2017/CMU-CS-17-102.pdf>. (Year: 2017).*

Cao, J. "Self-Organizing Agents for Grid Load Balancing", Fifth IEEE/ACM Int'l Workshop on Grid Computing, Nov. 8, 2004 [retrieved on Dec. 9, 2021]. Retrieved from the Internet: <URL: https://ieeexplore.ieee.org/document/1382856> (Year: 2004).*

Ye et al. "A Survey of Self-Organization Mechanisms in Multiagent Systems", IEEE Transactions on Systems, Man, and Cybernetics: Systems, vol. 47 No. 3, Mar. 2017 [retrieved on Dec. 9, 2021]. Retrieved from the Internet: <URL: https://ieeexplore.ieee.org/document/7383323>. (Year: 2017).*

* cited by examiner

DISTRIBUTED ARCHITECTURE FOR DETERMINING PERFORMANCE PARAMETERS

FIELD OF THE DISCLOSURE

The instant disclosure relates to distribution of tasks in information handling systems. More specifically, portions of this disclosure relate to distribution of tasks for determining configuration settings of information handling systems.

BACKGROUND

As the value and use of information increase, individuals and businesses seek additional ways to process and store information. One option available for such a purpose is the information handling system. An information handling system generally processes, compiles, stores, and/or communicates information or data for business, personal, or other purposes thereby allowing users to take advantage of the value of the information. Because technology and information handling requirements vary between different users or applications, information handling systems may also vary regarding what information is handled, how the information is handled, how much information is processed, stored, or communicated, and how quickly and efficiently the information may be processed, stored, or communicated. Variations in information handling system build and capabilities allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

As information handling systems increase in prevalence, efficiency of such systems increases in importance. Efficiency of information handling systems may be enhanced through efficient allocation of hardware and software resources to improve power consumption, memory usage, and processing capacity usage. Determination of ways to efficiently allocate information handling system resources can itself require significant system resources, and implementation may be impractical on many information handling systems due to speed, power, and time constraints.

Shortcomings mentioned here are only representative and are included simply to highlight that a need exists for improved information handling systems, particularly for improvements in efficient allocation of information handling system resources. Embodiments described herein address certain shortcomings but not necessarily each and every one described here or known in the art. Furthermore, embodiments described herein may present other benefits than, and be used in other applications than, those of the shortcomings described above.

SUMMARY

Many information handling systems are designed with portability, power consumption, cost, and ease of use in mind. Design of such devices requires tradeoffs in terms of functionality to maintain portability and to minimize power consumption and cost. Tradeoffs in device functionality necessary to meet power consumption, cost, and size restrictions may be reduced by adjusting system performance parameters based on system usage to enhance system performance.

Determination of adjustments necessary to enhance system performance can itself be a power and processing intensive task. Complex machine learning and/or artificial intelligence algorithms can be used to analyze system usage parameters, such as applications being run by the system, hardware characteristics of the system, tasks being performed by the system, an operating system being run on the system, and other usage parameters, to enhance system performance. Some information handling systems may not have the capabilities to perform the complex calculations that may enhance system performance. Advantages of analyzing data in this manner may be obtained, at least in part, by distributing the calculations across one or more information handling systems. The distributed tasks may include storing monitored information handling system performance, analyzing the historical performance for one information handling system, analyzing the historical performance for multiple information handling systems, and/or determining adjustments to performance parameters for individual information handling systems or groups of information handling systems.

The advantages of coordinating the operations of information handling systems multiply as such systems become more numerous and pervasive. For example, efficient allocation of resources, within individual information handling systems and across multiple information handling systems, can increase the number of tasks information handling systems can perform concurrently, enhance the speed with which an information handling system can perform tasks, and/or reduce power consumption. Such optimization can also allow information handling systems to perform tasks they might not otherwise have the resources to perform.

Performance of an information handling system may be enhanced through adjusting one or more performance parameters based on system usage. One or more usage parameters for a first information handling system may be monitored, sensed, or otherwise collected by the first information handling system. For example, changes in usage parameters over time may be monitored and recorded. The usage parameters may be analyzed to allocate determination of performance parameters between the first information handling system and a second information handling system. For example, determination of some performance parameters may require more processing resources than the first information handling system possesses, while determination of other performance parameters may require low latency. Performance parameters requiring significant processing resources may be allocated to the second information handling system while determination of performance parameters requiring low latency may be allocated to the first information handling system. Allocation of determination of performance parameters may also include determining whether performance parameters corresponding to collected usage parameters are stored in a memory of the first information handling system. If so, the performance parameters may be retrieved from the memory instead of allocating determination of the performance parameters between the first and second information handling systems.

The collected usage parameters may be transmitted to the second information handling system for analysis and determination of corresponding performance parameters. The usage parameters may be organized into self-describing packets for transmission, to identify the data to the second information handling system. Such identification may reduce the need for a permanent connection between the first and second information handling systems thereby reducing traffic between the two. If a determination of performance parameters has been allocated between the first information handling system and the second information handling system, usage parameters necessary for the determination of performance parameters that has been allocated to the second information handling system may be transmitted.

The second information handling system may generate one or more performance parameters for the first information handling system based on the one or more usage parameters. The second information handling system may store the generated performance parameters and corresponding usage parameters in a memory of the second information handling system. The second information handling system may then transmit the one or more performance parameters to the first information handling system. The first information handling system may then receive the one or more performance parameters. If determination of one or more performance parameters is allocated to the first information handling system, the first information handling system may generate one or more performance parameters based on collected usage parameters. The first information handling system may transmit the generated performance parameters and corresponding usage parameters to the second information handling system for storage in a memory of the second information handling system. The first information handling system may adjust one or more performance parameters of the first information handling system based on performance parameters the first information handling system has generated, retrieved from memory, or received from the second information handling system. For example, the first information handling system may activate or deactivate processing cores, adjust fan speed, adjust memory usage, and/or adjust allocation of other system resources based on the one or more performance parameters. In some cases, the first information handling system may modify the received performance parameters based on system characteristics or usage parameters of the first information handling system prior to adjusting performance parameters of the first information handling system.

Performance parameters determined by the second information handling system may be adjusted by a third information handling system or used by the third information handling system to generate one or more additional performance parameters. When the second information handling system has determined the one or more performance parameters, it may transmit the determined performance parameters to a third information handling system in addition to the first information handling system. The third information handling system may receive the one or more performance parameters and may determine one or more additional performance parameters based on the received performance parameters. The third information handling system may then transmit the determined additional performance parameters to the first information handling system, and the first information handling system may receive the one or more additional performance parameters. The first information handling system may adjust one or more performance parameters based, at least in part on the received one or more additional performance parameters.

An apparatus such as an information handling system or a component of an information handling system, such as a controller or processor, may be configured to perform the steps described herein. An information handling system may include a peripheral device capable of collecting and transmitting usage parameters, allocating determination of performance parameters, receiving and generating performance parameters, and adjusting performance parameters. A computer program product may contain a tangible, non-transitory, computer-readable medium containing code to perform the steps described herein.

The foregoing has outlined rather broadly certain features and technical advantages of embodiments of the present invention in order that the detailed description that follows may be better understood. Additional features and advantages will be described hereinafter that form the subject of the claims of the invention. It should be appreciated by those having ordinary skill in the art that the conception and specific embodiment disclosed may be readily utilized as a basis for modifying or designing other structures for carrying out the same or similar purposes. It should also be realized by those having ordinary skill in the art that such equivalent constructions do not depart from the spirit and scope of the invention as set forth in the appended claims. Additional features will be better understood from the following description when considered in connection with the accompanying figures. It is to be expressly understood, however, that each of the figures is provided for the purpose of illustration and description only and is not intended to limit the present invention.

BRIEF DESCRIPTION OF THE DRAWINGS

For a more complete understanding of the disclosed system and methods, reference is now made to the following descriptions taken in conjunction with the accompanying drawings.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA), smart phone, or smart watch), server (e.g., blade server or rack server), a network storage device, television, smart home device, digital assistant, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more virtual or physical buses operable to transmit communications between the various hardware and/or software components.

Adjustment of information handling system performance parameters based on usage characteristics of the information handling system can decrease power consumption, enhance functionality, reduce application response time, and extend the lifetime of information handling systems. For example, performance parameters of information handling systems can be adjusted based on the application or combination of applications being run, the tasks being executed by the applications being run, the operating system of the information handling system, and/or the environmental and hardware characteristics of the information handling system. Some information handling systems do not have the processing capabilities necessary to analyze usage and perform the calculations necessary to enhance system performance.

Figure 1:
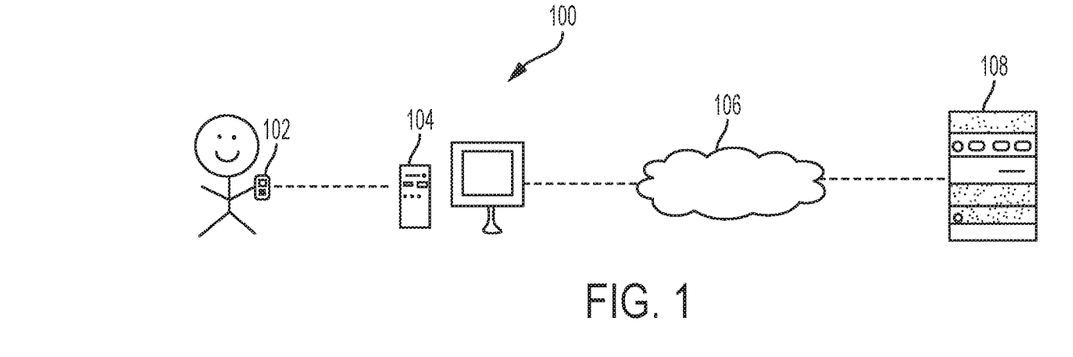
FIG. 1 is an illustration of an example system for distributed determination of performance parameters according to some embodiments of the disclosure.

A system of distributed determination of performance parameters for an information handling system can allow an information handling system to harness the processing capabilities of other information handling systems in optimizing its performance. Distributing determination of performance parameters across multiple information handling systems can reduce the time necessary to determine performance parameters, and allow determination of performance parameters the determination of which might otherwise be impossible, for enhancing operation of an information handling system. Such a system 100 may be implemented across several information handling systems as shown in FIG. 1. Determination of performance parameters for a first information handling system 102, such as a mobile device, may be allocated to the first information handling system 102, to a local information handling system 104 connected to the first information handling system 102 through a wired or wireless connection, such as a personal computer, and/or to an information handling system 108 connected to the first information handling system remotely, such as a server. Remote information handling systems may be connected to the first information handling system 102 through the cloud 106. Determination of performance parameters may be distributed to a plurality of remote information handling systems connected to the first information handling system 102 through the cloud 106, such as to a plurality of servers of a data center. Determination of performance parameters may also be distributed across a plurality of servers at a plurality of data centers, for example, local data centers, regional data centers, and central data centers. Distribution between more remote and more local information handling systems may be selected to achieve a desired latency for particular performance parameters. Distribution of determination of performance parameters may also be hierarchical. For example, performance parameters determined by remote information handling system 108 may be transmitted to local information handling system 104 and used to determine additional performance parameters for the first information handling system 102. Remote information handling systems may be connected to the first information handling system 102 directly through the cloud 106 or may connect to the first information handling system 102 through a local information handling system 104. Although only one local information handling system 104 and one remote information handling system 108 are pictured in FIG. 1, determination of performance parameters may be allocated across multiple local and remote information handling systems. Alternatively or additionally, determination of performance parameters for a local information handling system 104, such as a personal computer, may be distributed across one or more remote information handling systems, such as remote information handling system 106, and, potentially, one or more additional local information handling systems.

Figure 6:
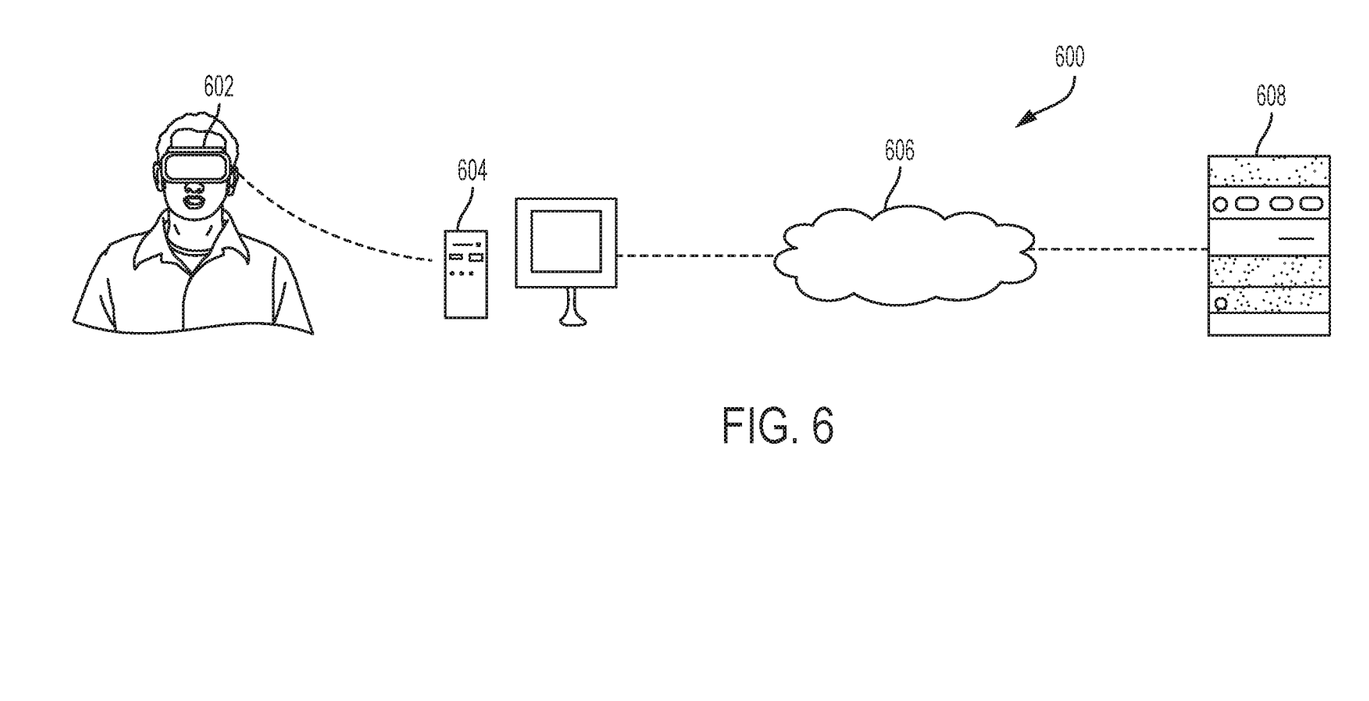
FIG. 6 is an illustration of an example system for distributed determination of performance parameters incorporating a head mounted display according to some embodiments of the disclosure.

In an example embodiment, a system 600 may include a head-mounted display (HMD) 602 connected, either through a physical, wired, connection or through a wireless connection to a personal computer (PC) 604, as illustrated in FIG. 6. The PC 604 may be connected to one or more servers 608 of a data center through the cloud 606. Determination of performance parameters for the HMD 602 may be allocated across the HMD 602, the PC 604, and the servers 608 of the data center. The HMD 602 and/or PC 604 may be running an application, such as a flight simulator, and may be optimized based on the application or applications being run and the tasks being performed by the application. The HMD 602 may require low latency in determination of certain performance parameters, such as performance parameters affecting the display of visuals related to one or more vehicles of the flight simulator, to avoid negatively impacting a user experience. Other performance parameters, such as those related to a terrain texture displayed on the HMD 602, may not be as sensitive to latency in their determination. Therefore, in distributing determination of performance parameters of the HMD 602 and/or PC 604, the determination of performance parameters related to the display of visuals related to one or more vehicles of the flight simulator may be allocated to the HMD 602 and/or the PC 604 to reduce latency. Determination of performance parameters related to a terrain texture displayed on the HMD 602 may be allocated to the one or more servers 608 connected to the PC 604 through the cloud 606, because of decreased sensitivity to latency. Thus, determination of performance parameters for a first information handling system, such as an HMD 602, may be distributed across one or more additional information handling systems, such as a PC 604 and/or servers 608 of a data center.

Figure 2:
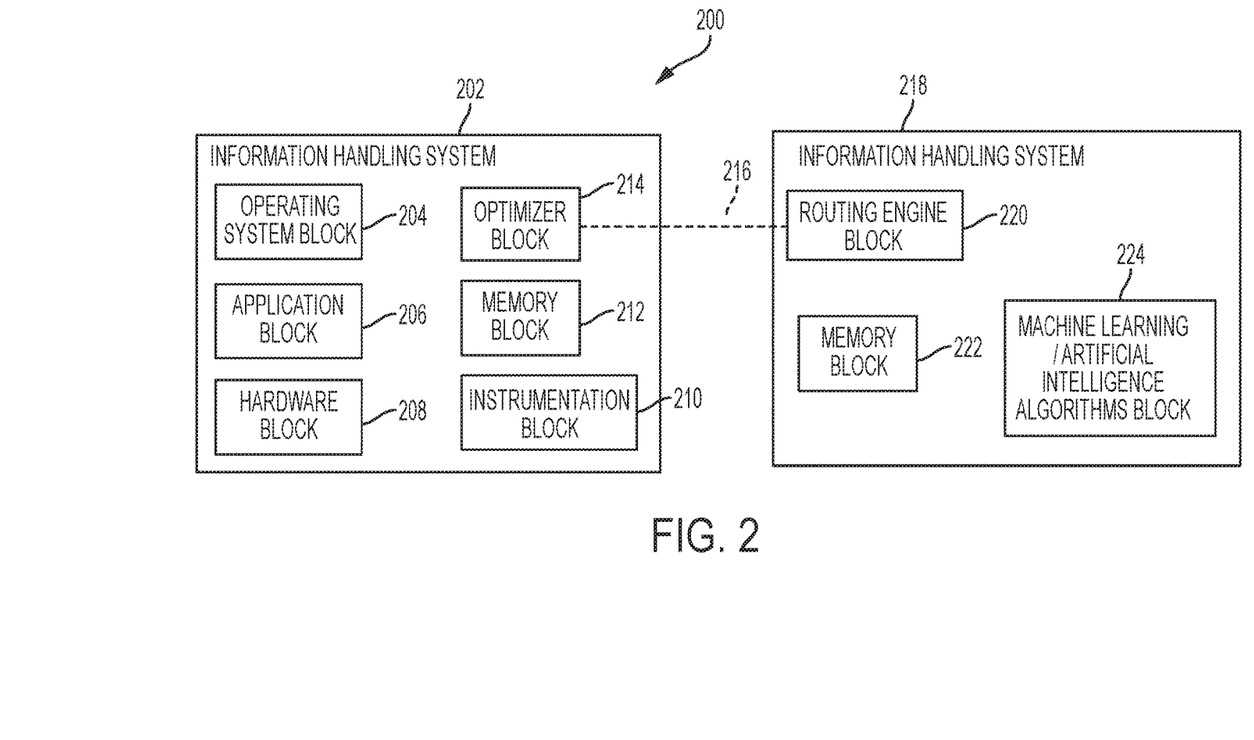
FIG. 2 is a block diagram illustrating a system for distributed determination of performance parameters for adjusting performance parameters of an information handling system according to some embodiments of the disclosure.

A system 200 of distributed determination of performance parameters across a first information handling system 202 and a second information handling system 218 is shown in FIG. 2. The first information handling system 202 may be running an operating system (OS), represented by OS block 204, and may be executing one or more applications, represented by applications block 202. The operating system and applications may be running on system hardware, represented by hardware block 208, including processors, memory, busses, fans, displays, hard drives, solid state drives, external media readers, graphics cards, and other information handling system components. System hardware may also include one or more peripheral devices such as external hard drives, memory, external media readers, input devices such as keyboards and/or mice, a camera, and other hardware peripheral devices. The system hardware may be coupled to hardware instrumentation, represented by instrumentation block 210, configured to monitor parameters related to the usage characteristics and properties of the system hardware and transmit the usage characteristics and properties to an optimizer, represented by optimizer block 214. System hardware, applications, and OS may transmit usage parameters directly to the optimizer as well. The optimizer may be a hardware or software component of information handling system 202. Alternatively, the optimizer may be contained on a peripheral device, such as a plug-in hardware acceleration device, coupled to the information handling system 202. The peripheral device may itself be connected to the second information handling system 218 and may contain a virtual machine, containing circular buffer data, with affinity to the instrumentation of the first information handling system. The optimizer may collect usage parameters related to the OS, applications, and hardware. The optimizer may store usage parameters in a local memory, represented by memory block 212, and may search the local memory for performance parameters corresponding to the collected usage parameters. For example, a local memory may store performance parameters associated with collected usage parameters. When the optimizer collects a set of usage parameters, it may search the memory to determine if performance parameters corresponding to the collected usage parameters are already stored in the memory. The optimizer may also apply algorithms, such as machine learning and/or artificial intelligence algorithms, to locally generate performance parameters corresponding to collected usage parameters. The optimizer may generate the performance parameters itself or may transmit collected usage parameters to another component of the first information handling system 202 for generation of performance parameters. The optimizer may also receive performance parameters from information handling system 218 and may modify the performance parameters received from information handling system 218. The optimizer may adjust performance parameters of the information handling system 202 based on received, generated, and/or modified performance parameters.

The first information handling system 202 may be connected 216 to the second information handling system 218 directly or remotely, such as through the cloud. The optimizer may transmit usage parameters for the first information handling system 202 to the second information handling system 218 via connection 216. For example, the optimizer may transmit usage parameters to a routing engine, represented by routing engine block 220, of the second information handling system 218. The routing engine may determine performance parameters based on the received usage parameters and may transmit the determined performance parameters to the first information handling system 202. For example, the routing engine 220 may search a memory, represented by memory block 222, of the second information handling system 218 for performance parameters corresponding to received usage parameters. The routing engine 220 may also apply machine learning and/or artificial intelligence algorithms, represented by machine learning and artificial intelligence algorithms block 224, which may exist in hardware or software of information handling system 218, to generate performance parameters based on received usage parameters.

Figure 3:
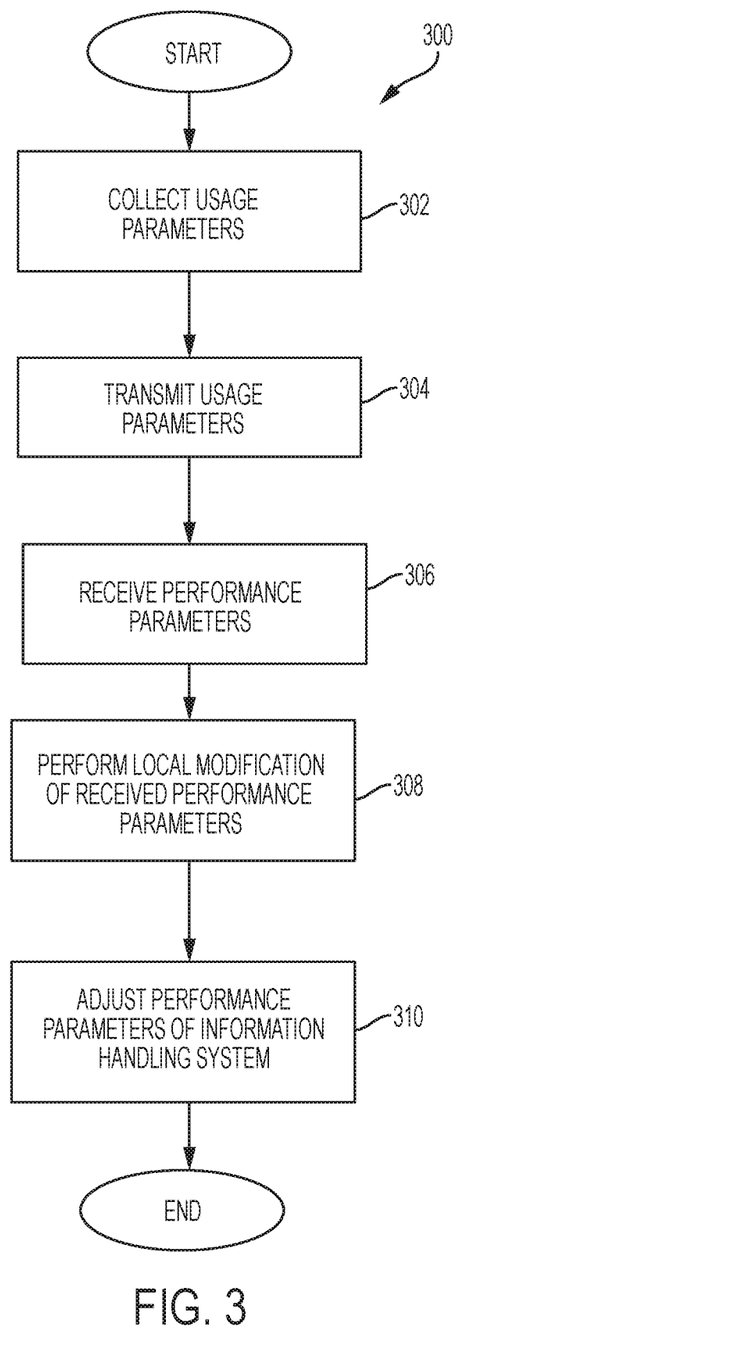
FIG. 3 is an illustration of an example method of adjusting performance parameters of a first information handling system based on performance parameters received from a second information handling system according to some embodiments of the disclosure.

Performance of an information handling system may be enhanced through adjustment of performance parameters of the information handling system based on performance parameters received from another information handling system or determined locally. A method 300 for enhancing performance of a first information handing system is illustrated in FIG. 3. The method begins at step 302 with collection of usage parameters for a first information handling system. Collection of usage parameters may include sensing and/or monitoring the usage parameters and recording the sensed and monitored usage parameters. The usage parameters may be parameters related to an operating system of the information handling system, one or more applications running on the information handling system, hardware of the information handling system, and firmware of the information handling system. For example the usage parameters may include runtime characterization of applications and information handling system workloads, user behaviors and preferences, an ambient temperature of the information handling system, a component temperature of the information handling system, memory usage of the information handling system, processing capacity utilization of the information handling system, an OS version of the information handling system, background processes of the OS, a configuration of the OS, a firmware version of the information handling system and components of the information handling system, a state and/or utilization of components of the information handling system and peripheral devices connected to the information handling system, tasks being performed by applications being executed on the information handling system, the types of applications being executed on the information handling system (e.g., gaming, word processing, video editing, graphical design, etc.), response times of applications being executed on the information handling system, power usage of the information handling system and/or components of the information handling system, data input and output of the information handling system and components of the information handling system, hardware configuration and capabilities of the information handling system, and other parameters related to the usage of the information handling system. Usage parameters may include data indicating bottlenecks of applications, tasks being run by applications, or system processes. Collection of usage parameters at step 302 may include monitoring for changes in usage parameters and recording detected changes.

After the usage parameters are collected, at step 302, they may be transmitted, at step 304, to a second information handling system. Usage parameters may be transmitted to, for example, a remote information handling system, through the cloud, or to a local information handling system. The second information handling system may, for example, be a local information handling system such as a PC or local server, or a remote information handling system connected to the first information handling system through the cloud, such as a server at a data center. Usage parameters may be transmitted to multiple information handling systems, such as multiple servers at multiple data centers. Usage parameters may be organized into self-describing packets for transmission. Such packets may contain information identifying the source and/or contents of the packets to the second information handling system so that a constant connection between the first information handling system and the second information handling system need not be maintained. At step 306, the first information handling system may receive performance parameters from the second information handling system. The first information handling system may receive performance parameters from multiple other information handling systems to which it had transmitted one or more usage parameters. The first information handling system may then perform local modifications to the received performance parameters at step 308. For example, the performance parameters transmitted from the second information handling system may be an outline of a configuration of one or more system performance parameters that may then be modified based on calculations performed by the first information handling system. Then, at step 310, the first information handling system may adjust performance parameters corresponding to the received performance parameters to enhance system performance.

Figure 4:
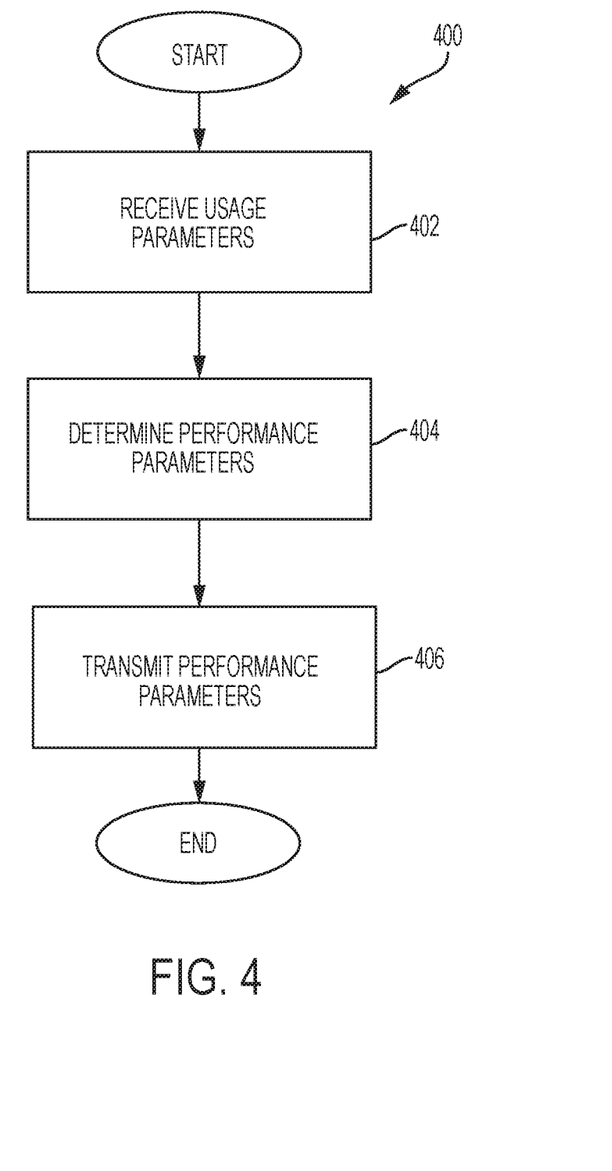
FIG. 4 is an illustration of an example method of determining performance parameters on a second information handling system for adjusting performance parameters of a first information handling system according to some embodiments of the disclosure.

As the determination of performance parameters may be processor and/or memory intensive and may exceed the capabilities of many information handling systems, a second information handling system may determine performance parameters for a first information handling system based on received usage parameters. In some implementations, determination of performance parameters for a first information handling system may be distributed across multiple information handling systems. A method 400 for determining performance parameters based on received usage parameters is illustrated in FIG. 4. At step 402, the second information handling system may receive one or more usage parameters from a first information handling system. The second information handling system may perform runtime optimization of the first information handling system, receiving usage parameters over time until it has obtained sufficient usage parameter information to determine one or more performance parameters. The second information handling system may, at step 404, determine one or more performance parameters for the first information handling system based on the received usage parameters. Performance parameters may be determined through searching a memory of the second information handling system for one or more performance parameters corresponding to the received usage parameters. The memory may, for example, contain one or more system profiles associated with performance parameters and corresponding usage parameters collected from other information handling systems. Usage parameters and corresponding performance parameters may also be associated with one or more user profiles containing data related to the usage habits of a particular user of an information handling system. Alternatively or additionally, performance parameters may be generated based on the received usage parameters using artificial intelligence and/or machine learning algorithms, such as supervised, unsupervised, or reinforcement training algorithms, to analyze the usage parameters and determine performance parameters that will enhance system performance. For example, the second information handling system may use algorithms to identify system bottlenecks present in the first information handling system such as bus bandwidth, memory usage, or network usage, and determine performance parameters that will reduce the effects of, or even eliminate, such bottlenecks. In some embodiments, a rule-based engine may be used alone or in combination with other algorithms for determining performance parameters. After the performance parameters are determined, the second information handling system may, at step 406, transmit the performance parameters to the first information handling system.

Determination of performance parameters may be hierarchical. For example, after the performance parameters are determined at step 406, the second information handling system may transmit the determined performance parameters to one or more additional information handling systems, such as a third information handling system, to which the determination of performance parameters has been allocated. The third information handling system may also have received usage parameters from the first information handling system. The third information handling system may determine additional performance parameters based, at least in part, on the received performance parameters. The additional performance parameters may also be determined based, at least in part on received usage parameters of the first information handling system. The third information handling system may then transmit the additional performance parameters to the first information handling system, and the first information handling system may adjust its performance parameters based, at least in part, on the received additional performance parameters.

Figure 5:
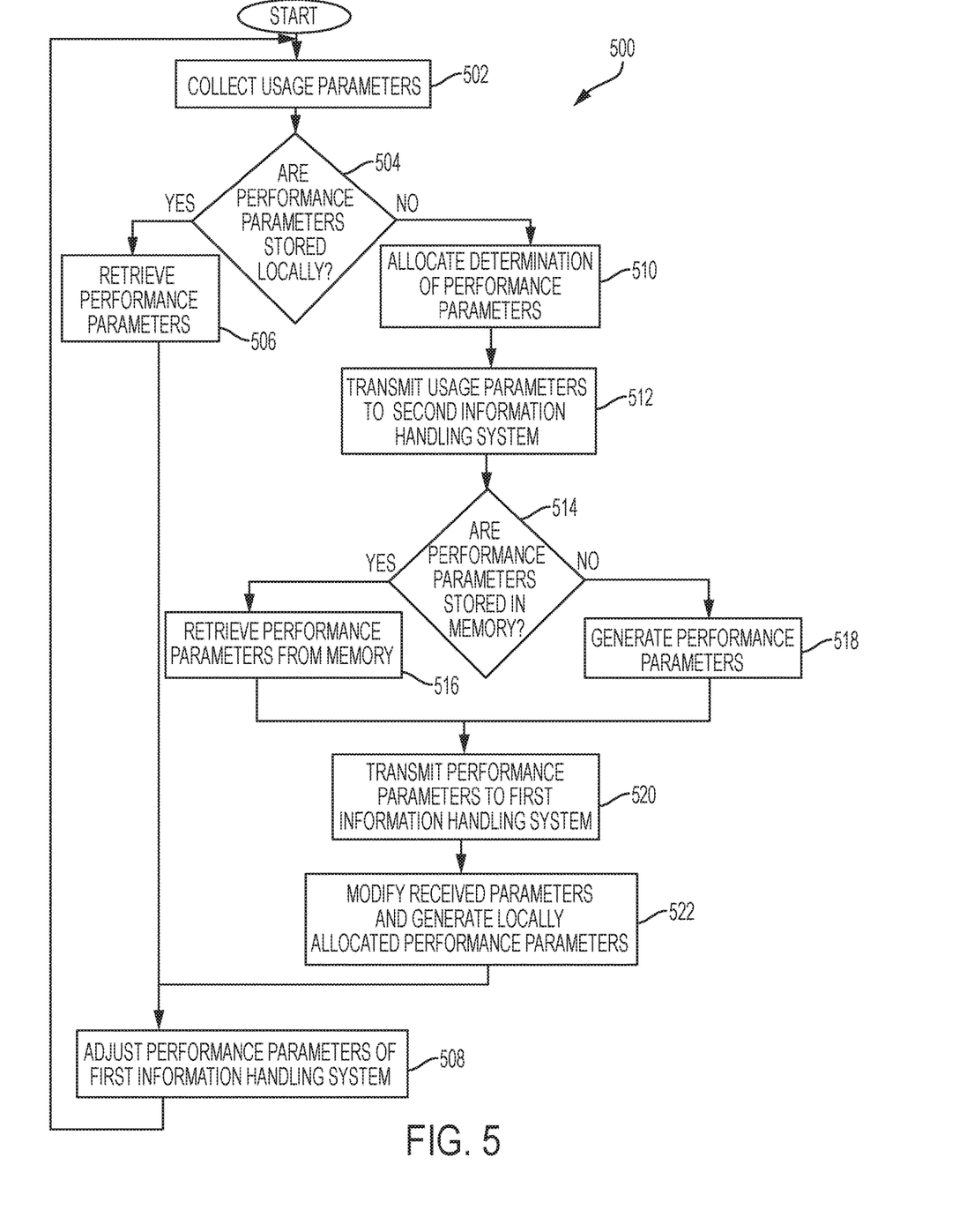
FIG. 5 is an illustration of an example method of allocating determination of performance parameters for adjusting performance parameters of a first information handling system across the first information handling system and a second information handling system according to some embodiments of the disclosure.

One distribution of the determination of performance parameters for a first information handling system may use a second information handling system for determining the performance parameters. For example, efficient operation of the first information handling system may require low latency in determination of certain performance parameters, the determination of which may be allocated to the first information handling system, while the determination of other performance parameters may require more processing power and, therefore, may be allocated to the second information handling system. A method 500 for distributed determination of performance parameters is illustrated in FIG. 5. The method 500 may begin at step 502 with collection of usage parameters of a first information handling system. Usage parameters may be parameters related to usage of hardware or software features of the information handling system, as described with respect to FIG. 3. A determination may then be made by the first information handling system, at step 504, of whether performance parameters corresponding to collected usage parameters are stored locally. For example, the first information handling system may have one or more performance parameters corresponding to one or more usage parameters stored in a memory that it had previously calculated or received from another information handling system. If the one or more performance parameters correspond to the collected usage parameters, the first information handling system may retrieve the one or more performance parameters, at step 506 and adjust one or more performance parameters of the first information handling system based on the retrieved performance parameters at step 508. The collected usage parameters and corresponding performance parameters may also be transmitted to and stored at a second information handling system.

As storage on many information handling systems is limited, storage of an exhaustive library of performance parameters and corresponding usage parameters at a first information handling system may be infeasible. To reduce storage consumption, some performance parameters may be stored in a memory of the first information handling system while others are stored elsewhere. If the first information handling system does not contain performance parameters corresponding to the collected usage parameters, the first information handling system may allocate, at step 510, determination of performance parameters between the first information handling system and the second information handling system. For example, determination of performance parameters requiring low latency, such as those related to graphical processing and/or gaming applications, may be allocated to the first information handling system while determination of performance parameters not requiring low latency or requiring processing intensive calculations, such as those related to power consumption or temperature control, may be allocated to a second information handling system. The first information handling system may determine whether the performance parameters are stored in a memory of the second information handling system prior to allocating the determination of performance parameters.

The first information handling system may, at step 512, transmit the collected usage parameters to the second information handling system, and the second information handling system may receive the transmitted usage parameters. The first information handling system may transmit only collected usage parameters corresponding to performance parameters to be determined by the second information handling system, or it may transmit all collected usage parameters. The second information handling system may then determine, at step 514, whether performance parameters corresponding to the received usage parameters are stored in a memory of the second information handling system. For example, the second information handling system may have, stored in a memory, multiple sets of performance parameters and corresponding usage parameters that it has received from other information handling systems or previously generated itself. For example, the second information handling system may collect usage parameters and corresponding performance parameters from multiple information handling systems and may store them in system profiles in a system memory. In determining whether performance parameters corresponding to received usage parameters are stored in a memory of the second information handling system, the second information handling system may search the memory for received usage parameters or for a profile containing one or more received usage parameters. If performance parameters associated with the received usage parameters are stored in a memory of the second information handling system, the second information handling system may retrieve the performance parameters from memory. The second information handling system may also evaluate multiple profiles or performance parameters stored in its memory to determine a profile or set of performance parameters that will provide the greatest performance enhancement, based on the received usage parameters. The determined profile or set of performance parameters may then be retrieved from memory. Thus performance parameters associated with usage parameters of multiple information handling systems may be aggregated by the second information handling system and used to adjust performance parameters of the first information handling system.

If performance parameters corresponding to received usage parameters are not stored in a memory of the second information handling system, the second information handling system may, at step 518, generate performance parameters based on the received usage parameters. Performance parameters may be generated through the application of optimization algorithms, such as machine learning and/or artificial intelligence algorithms. The optimization algorithms may make use of multiple profiles stored in a memory of the second information handling system containing usage parameters and corresponding performance parameters, previously generated by the second information handling system and/or received from other information handling systems, in generating performance parameters based on the received usage parameters. For example, machine learning and/or artificial intelligence algorithms may be used to analyze combinations of usage and performance parameters stored in the memory of the second information handling system and to determine the ways in which adjustments made to performance parameters have caused improvements in system performance, which may be indicated by changes in usage parameters following adjustment of performance parameters. The second information handling system may store generated performance parameters and corresponding usage parameters in a memory. Such stored parameters may be accessed when additional requests for determination of performance parameters are received in the future. For example, the second information handling system may have a substantial number of performance parameters and associated usage parameters stored in a memory and may use the usage and performance parameters to generate performance parameters based on the received usage parameters. In some instances, some performance parameters may be retrieved from a memory of the second information handling system while others may be generated.

After the performance parameters are determined, by retrieval from memory and/or generation by calculation, the second information handling system may, at step 520 transmit the performance parameters to the first information handling system. The first information handling system may then modify the received performance parameters and may generate performance parameters allocated, at step 510, to be determined locally. Modification of received performance parameters, at step 522, may be based on collected usage parameters or based on the specific hardware and characteristics of the system. The first information handling system may generate the performance parameters allocated to be determined locally at any point in the method 500, prior to the adjustment of performance parameters at step 508. After performance parameters have been modified, retrieved, received, and/or generated, the first information handling system may, at step 508, adjust one or more performance parameters based on the retrieved, received, modified, and/or generated performance parameters. For example, the first information handling system may activate or deactivate processing cores, adjust fan speed, adjust memory usage, adjust data transmission paths and bandwidth usage of system busses, data I/O of the information handling system and/or components of the information handling system, and/or adjust allocation of other system resources.

The method 500 may be repeated at an interval or in response to an event for generation of performance parameters and adjustment of performance parameters in response to changes in system usage parameters as the first information handling system continues to collect usage parameters. For example, the first information handling system may collect usage parameters for a period following initialization of the first information handling system and transmit the collected parameters to the second information handling system for determination of a set of performance parameters that may form a functional baseline for the first information handling system. The second information handling system may then transmit the determined performance parameters to the first information handling system, and the first information handling system may adjust system performance parameters based on the received performance parameters. The second information handling system may then continue to receive usage parameters, modify the determined performance parameters, and transmit the modified performance parameters as the first information handling system continues to run and collect and transmit usage parameters. The second information handling system may also transmit modified performance parameters to a third information handling system as the first information handling system continues to run and collect and transmit usage parameters to the second information handling system.

In one embodiment, the first information handling system may collect usage parameters related to the tasks executed by a graphical simulation application and OS processes related to the application. For example, an operating system of the first information handling system may schedule system processes and application tasks to utilize all processing cores of the information handling system. Such a configuration, while useful for executing multiple processes and tasks simultaneously, may impede the execution of tasks of the graphical simulation application by creating bottlenecks in system busses and/or in short term memory in transmitting data to and from the processing cores and temporarily storing data. The first information handling system may transmit the usage parameters to the second information handling system. The second information handling system may then determine, based on the usage parameters, that a way to improve efficiency in operation of the first information handling system would be to deactivate all but one of the processing cores. The second information handling system may make the determination by searching a local memory for performance parameters related to the received usage parameters or by applying one or more machine learning and/or artificial intelligence algorithms to determine ways of enhancing system efficiency. The second information handling system may then generate one or more performance parameters indicating that the first information handling system should deactivate all but one of the processing cores and may transmit the performance parameters to the first information handling system. Upon receiving the performance parameters, the first information handling system may modify the received performance parameters. For example, if the performance parameters instruct the first information handling system to deactivate all but one of the processing cores, but important processes are running that require activation of at least two processing cores, the first information handling system may modify the performance parameters to indicate that the first information handling system should deactivate all but two of the processing cores. The first information handling system may then deactivate all but two of the processing cores based on the modified performance parameters.

In another embodiment, a first information handling system, such as a PC, may generate performance parameters locally as usage parameters are collected. The locally determined performance parameters and corresponding usage parameters may be transmitted to a second information handling system, for example a server at a data center connected to the first information handling system through the cloud, for storage in a memory of the second information handling system. The performance parameters and corresponding usage parameters may be associated with a profile of the first information handling system. When the first information handling system encounters usage parameters requiring determination of performance parameters that should be determined by the second information handling system, for example, performance parameters the determination of which requires more memory and/or processing power than is available on the first information handling system, it may transmit the usage parameters to the second information handling system. The second information handling system may then determine performance parameters based on the received usage parameters.

In addition to transmitting the determined performance parameters to the first information handling system, the second information handling system may store the received usage parameters and determined performance parameters in a memory and may associate the usage and performance parameters with the profile of the first information handling system. At any point in the process, after the profile has been created, the second information handling system may transmit the performance parameters associated with the profile of the first information handling system to one or more additional information handling systems for configuration of performance parameters of the one or more additional information handling systems based on the performance parameters associated with the profile. Therefore, a plurality of information handling systems may adjust their system performance parameters to achieve a similar or identical configuration of performance parameters based on the profile of the first information handling system. For example, to maintain similar operating conditions on an array of laptop computers, a profile containing one or more performance parameters may be pushed to the laptop computers, and one or more performance parameters of the laptop computers may be adjusted accordingly.

The schematic flow chart diagrams of FIGS. 3-5 are generally set forth as logical flow chart diagrams. As such, the depicted order and labeled steps are indicative of aspects of the disclosed method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagram, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

The operations described above may be performed by any circuit configured to perform the described operations. Such a circuit may be an integrated circuit (IC) constructed on a semiconductor substrate and include logic circuitry, such as transistors configured as logic gates, and memory circuitry, such as transistors and capacitors configured as dynamic random access memory (DRAM), electronically programmable read-only memory (EPROM), or other memory devices. The logic circuitry may be configured through hard-wire connections or through programming by instructions contained in firmware. Further, the logic circuitry may be configured as a general-purpose processor (e.g., CPU or DSP) capable of executing instructions contained in software. The firmware and/or software may include instructions that cause the processing of signals described herein to be performed. The circuitry or software may be organized as blocks that are configured to perform specific functions. Alternatively, some circuitry or software may be organized as shared blocks that can perform several of the described operations.

If implemented in firmware and/or software, functions described above may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise random access memory (RAM), read-only memory (ROM), electrically-erasable programmable read-only memory (EEPROM), compact disc read-only memory (CD-ROM) or other optical disk storage, magnetic disk storage or other magnetic storage devices, or any other medium that can be used to store desired program code in the form of instructions or data structures and that can be accessed by a computer. Disk and disc includes compact discs (CD), laser discs, optical discs, digital versatile discs (DVD), floppy disks and Blu-ray discs. Generally, disks reproduce data magnetically, and discs reproduce data optically. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims.

Although the present disclosure and certain representative advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the present disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. A method, comprising:
   collecting, by a first information handling system, one or more usage parameters for the first information handling system;
   transmitting, to a second information handling system, a first portion of the one or more usage parameters for analysis;
   determining, by the first information handling system, to allocate determination of one or more first performance parameters to the first information handling system and one or more second performance parameters to the second information handling system, wherein the determination to allocate determination of one or more first performance parameters to the first information handling system and one or more second performance parameters to the second information handling system is based, at least in part, on a processing requirement for determination of the one or more first performance parameters and the one or more second performance parameters and a processing power of the first information handling system;
   determining, by the first information handling system, one or more first performance parameters based on a second portion of the one or more usage parameters;
   receiving, from the second information handling system, the one or more second performance parameters;
   modifying the one or more second performance parameters received from the second information handling system prior to adjusting the first information handling system; and
   adjusting the first information handling system based on the one or more first performance parameters and the one or more second performance parameters.

2. The method of claim 1, wherein the step of determining to allocate comprises determining whether one or more second performance parameters corresponding to the first portion of the one or more usage parameters are stored in a memory of the first information handling system, and
   wherein the step of transmitting is performed if the one or more second performance parameters are not stored in a memory of the first information handling system.

3. The method of claim 1, wherein the steps of collecting, transmitting, and receiving are performed by a peripheral device coupled to the first information handling system.

4. The method of claim 1, wherein the step of transmitting comprises organizing the first portion of the one or more usage parameters into self-describing packets.

5. The method of claim 1, wherein the step of adjusting comprises activating or deactivating one or more processing cores of the first information handling system.

6. The method of claim 1, wherein the step of determining to allocate is further based on a latency requirement for determining the first performance parameters and the second performance parameters.

7. The method of claim 1, wherein the first information handling system comprises a head-mounted display (HMD), and wherein the one or more first performance parameters and the one or more second performance parameters comprise performance parameters for the HMD.

8. A method, comprising:
   collecting, by a first information handling system, one or more usage parameters for the first information handling system;
   determining, by first information handling system, to allocate, for determination, one or more first performance parameters to the first information handling system and one or more second performance parameters to the second information handling system, wherein the determination to allocate determination of one or more first performance parameters to the first information handling system and one or more second performance parameters to the second information handling system is based, at least in part, on a processing requirement for determination of the one or more first performance parameters and the one or more second performance parameters and a processing power of the first information handling system;
   transmitting, to the second information handling system, a first portion of the one or more usage parameters related to the determination of the one or more second performance parameters allocated to the second information handling system;
   receiving, at the second information handling system, the first portion of the one or more usage parameters for the first information handling system;
   determining, by the second information handling system, the one or more second performance parameters for the first information handling system based on the first portion of the one or more usage parameters;
   transmitting the one or more second performance parameters to the first information handling system;
   determining, by the first information handling system, one or more first performance parameters for the first information handling system based on a second portion of the one or more usage parameters;

receiving the one or more second performance parameters at the first information handling system;

modifying the one or more second performance parameters received from the second information handling system prior to adjusting the first information handling system; and adjusting the first information handling system based on the one or more second performance parameters and the one or more first performance parameters.

9. The method of claim 8, wherein the step of determining to allocate comprises determining whether the one or more second performance parameters are stored in a memory of the first information handling system, and wherein the step of transmitting is performed if the one or more second performance parameters are not stored in the memory of the first information handling system.

10. The method of claim 8, further comprising:

transmitting, by the second information handling system, the one or more second performance parameters to a third information handling system;

determining, by the third information handling system, one or more additional performance parameters based, at least in part, on the one or more second performance parameters;

transmitting, by the third information handling system, the one or more additional performance parameters to the first information handling system;

receiving the one or more additional performance parameters at the first information handling system; and adjusting the first information handling system based, at least in part, on the received one or more additional performance parameters.

11. The method of claim 8, wherein the step of adjusting comprises activating or deactivating one or more processing cores of the first information handling system based on at least one of the one or more first performance parameters or the one or more second performance parameters.

12. The method of claim 8, wherein the step of determining one or more second performance parameters comprises:

determining if the one or more second performance parameters corresponding to the received one or more usage parameters are stored in a memory of the second information handling system; and if the one or more second performance parameters are not stored in the memory of the second information handling system, applying an algorithm to generate the one or more second performance parameters based on the first portion of the one or more usage parameters.

13. The method of claim 12, further comprising storing the one or more second performance parameters and the first portion of the one or more usage parameters in a memory of the second information handling system.

14. The method of claim 8, wherein the step of determining to allocate is further based on a latency requirement for determining the first performance parameters and the second performance parameters.

15. A first information handling system, comprising:
a processor; and
a memory,
wherein the processor is configured to perform steps comprising:

collecting one or more usage parameters for the first information handling system;

transmitting, to a second information handling system, a first portion of the one or more usage parameters for analysis;

determining to allocate determination of one or more first performance parameters to the first information handling system and one or more second performance parameters to the second information handling system, wherein the determination to allocate determination of one or more first performance parameters to the first information handling system and one or more second performance parameters to the second information handling system is based, at least in part, on a processing requirement for determination of the one or more first performance parameters and the one or more second performance parameters and a processing power of the first information handling system;

determining one or more first performance parameters based on a second portion of the one or more usage parameters;

receiving, from the second information handling system, the one or more second performance parameters;

modifying the one or more second performance parameters received from the second information handling system prior to adjusting the first information handling system; and adjusting the first information handling system based on the one or more first performance parameters and the one or more second performance parameters.

16. The information handling system of claim 15, wherein the step of determining to allocate comprises determining whether one or more second performance parameters corresponding to the first portion of the one or more usage parameters are stored in a memory of the first information handling system, and wherein the step of transmitting is performed if the one or more second performance parameters are not stored in a memory of the first information handling system.

17. The information handling system of claim 15, wherein the step of transmitting comprises organizing the first portion of the one or more usage parameters into self-describing packets.

18. The information handling system of claim 15, wherein the step of adjusting comprises activating or deactivating one or more processing cores of the first information handling system.

19. The information handling system of claim 15, wherein the first information handling system comprises a head-mounted display (HMD), and wherein the one or more first performance parameters and the one or more second performance parameters comprise performance parameters for the HMD.

20. The information handling system of claim 15, wherein the step of determining to allocate is further based on a latency requirement for determining the first performance parameters and the second performance parameters.

* * * * *